United States Patent
Berndt et al.

(10) Patent No.: US 7,768,662 B2
(45) Date of Patent: Aug. 3, 2010

(54) SYSTEM AND METHOD FOR CONTROLLING ACCESS

(75) Inventors: John W. Berndt, Fairport, NY (US); Robert V. Gerardi, Penfield, NY (US); John Sotack, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1373 days.

(21) Appl. No.: 10/073,374

(22) Filed: Feb. 12, 2002

(65) Prior Publication Data

US 2003/0151760 A1  Aug. 14, 2003

(51) Int. Cl.
*G06K 15/00* (2006.01)
*B41B 1/00* (2006.01)

(52) U.S. Cl. .................................. 358/1.14; 358/1.15

(58) Field of Classification Search ............. 358/1.14, 358/1.15, 1.13, 1.1; 399/80, 12, 13, 79
See application file for complete search history.

(56) References Cited

U.S. PATENT DOCUMENTS

| | | | |
|---|---|---|---|
| 5,493,635 A | 2/1996 | Brindle et al. | |
| 5,603,060 A | 2/1997 | Weinberger et al. | |
| 6,009,284 A | 12/1999 | Weinberger et al. | |
| 6,189,113 B1 | 2/2001 | Rabb et al. | |
| 6,216,113 B1 | 4/2001 | Aikens et al. | |
| 6,233,631 B1 | 5/2001 | Dombrowski et al. | |
| 6,282,383 B1 | 8/2001 | Weinberger et al. | |
| 6,313,921 B1 * | 11/2001 | Kadowaki | 358/1.15 |
| 6,658,650 B1 * | 12/2003 | Bates | 717/127 |
| 6,877,097 B2 * | 4/2005 | Hamid et al. | 713/186 |
| 6,993,666 B1 * | 1/2006 | Hokkanen et al. | 726/5 |
| 7,068,383 B1 * | 6/2006 | Bello et al. | 358/1.15 |
| 2006/0119892 A1 * | 6/2006 | Kujirai | 358/1.15 |

FOREIGN PATENT DOCUMENTS

| | | | |
|---|---|---|---|
| EP | 0982653 A | 3/2000 |
| GB | 2 359 392 A | 8/2001 |
| JP | 6110629 A | 4/1994 |

OTHER PUBLICATIONS

Zenographics, "PostScript Interpreter" 2001 [Retrieved from the Internet at www.zeno.com/Technology/Windows_Host_Raster_Printing/PostScript.asp on Nov. 14, 2001].
DTP tips—Why use postscript, what is postscript, install a driver, print to disk, "Your computer files can be used for Reprographics through using the PostScript language" 2001 [Retrieved from the internet at www.printstop.com/tips1.html on Nov. 14, 2001].
U.S. Appl. No. 09/259,475, filed Feb. 26, 1999 by Salgado et al.

* cited by examiner

Primary Examiner—Gabriel I Garcia (57) ABSTRACT

A system for controlling access to devices using direct connect protocols includes a network of computers, printers, personal digital assistants and servers. Client devices are programmed to embed one or more access codes in job streams (e.g., a word-processing file to be printed) when requesting services from other devices. A method includes a device (e.g., network printer) parsing a job stream received from a client device (e.g., computer) to find one or more embedded access codes, identifying each embedded access code that matches a stored access code, and authorizing one or more device features associated with each identified matching access code.

31 Claims, 5 Drawing Sheets

SYSTEM AND METHOD FOR CONTROLLING ACCESS

FIELD OF THE INVENTION

This invention relates generally to device access control and, more particularly, to a method and system for controlling access to devices by embedding access codes in job streams sent to the devices for determining whether users may access particular device features.

BACKGROUND OF THE INVENTION

Many organizations such as larger business entities providing any sort of network services to clients (e.g., employees or customers), must constantly monitor the accessing and consumption of their network resources. There are systems available that can selectively provide clients with access to the services performed by various network devices such as printers, copiers and facsimile machines. One exemplary system employs a job server to act as a buffer between the devices and the clients for filtering out unauthorized use. In particular, the job server intercepts the clients' service requests and consults an authorized usage list before enabling the service request to reach the device to be carried out. Although these systems work, maintaining such a job server may prove to be difficult, costly and labor-intensive as it involves frequent attention and specialized knowledge.

Furthermore, job servers are often unaware or are incapable of controlling the particular features of a device (e.g., a network printer) such as full-duplex or color printing, and thus are forced to adopt an all or nothing policy of simply granting or denying access to devices. But an organization may also desire controlling access to particular features within the services provided by its network devices.

For instance, an organization that maintains a network printer for use by its employees may want to make particular printing options unavailable to one or more groups of employees. The printer may be capable of generating monochrome prints at a rate of 50 pages per minute while generating color prints at 12.5 pages per minute. The organization may want to grant all of its employees unfettered access to the printer for generating monochrome prints since they can be generated relatively quickly and are generally inexpensive. On the other hand, the organization may want to restrict generating color prints to high-level managers only since they take relatively longer and are generally more expensive to generate.

Additionally, an organization that cannot restrict unnecessary utilization of particular device features consequently may need to purchase additional devices to maintain a desired level of service. For example, an organization may need to purchase two network printer devices to service a department where the resources of one properly managed device could suffice. Thus, a need clearly exists for an inexpensive, reliable and convenient way of controlling access to the various services provided by an organization's devices and the particular features available within those services.

SUMMARY OF THE INVENTION

A system for controlling access to devices in accordance with embodiments of the present invention includes an access code system that embeds at least one access code within a job stream where each embedded access code is associated with one or more device features, and a service transmission system that transmits the job stream to one of the devices.

A method and a program storage device readable by a machine and tangibly embodying a program of instructions executable by the machine for controlling access to devices in accordance with embodiments of the present invention includes embedding at least one access code within a job stream where each embedded access code is associated with one or more device features, and transmitting the job stream to one of the devices.

A system for controlling access to devices in accordance with embodiments of the present invention includes a parsing system that parses a job stream to find at least one embedded access code, an access code identification system that identifies each embedded access code matching a stored access code, and an authorization system that authorizes one or more device features associated with each identified matching access code.

A method and a program storage device readable by a machine and tangibly embodying a program of instructions executable by the machine for controlling access to devices in accordance with embodiments of the present invention include parsing a job stream to find at least one embedded access code, identifying each embedded access code that matches a stored access code, and authorizing one or more device features associated with each identified matching access code.

The present invention provides an inexpensive, reliable and convenient way of controlling access to devices and particular device features using direct connect protocols without incurring the high costs and intensive labor or requiring specialized skills associated with using a separate job server. The present invention also enables access codes to be easily programmed or updated on the devices. Additionally, controlling access to particular device features results in efficient device resource management. Moreover, the efficient resource management enables organizations to use a lesser number of devices to provide significant cost savings.

DETAILED DESCRIPTION OF THE INVENTION

Figure 1:
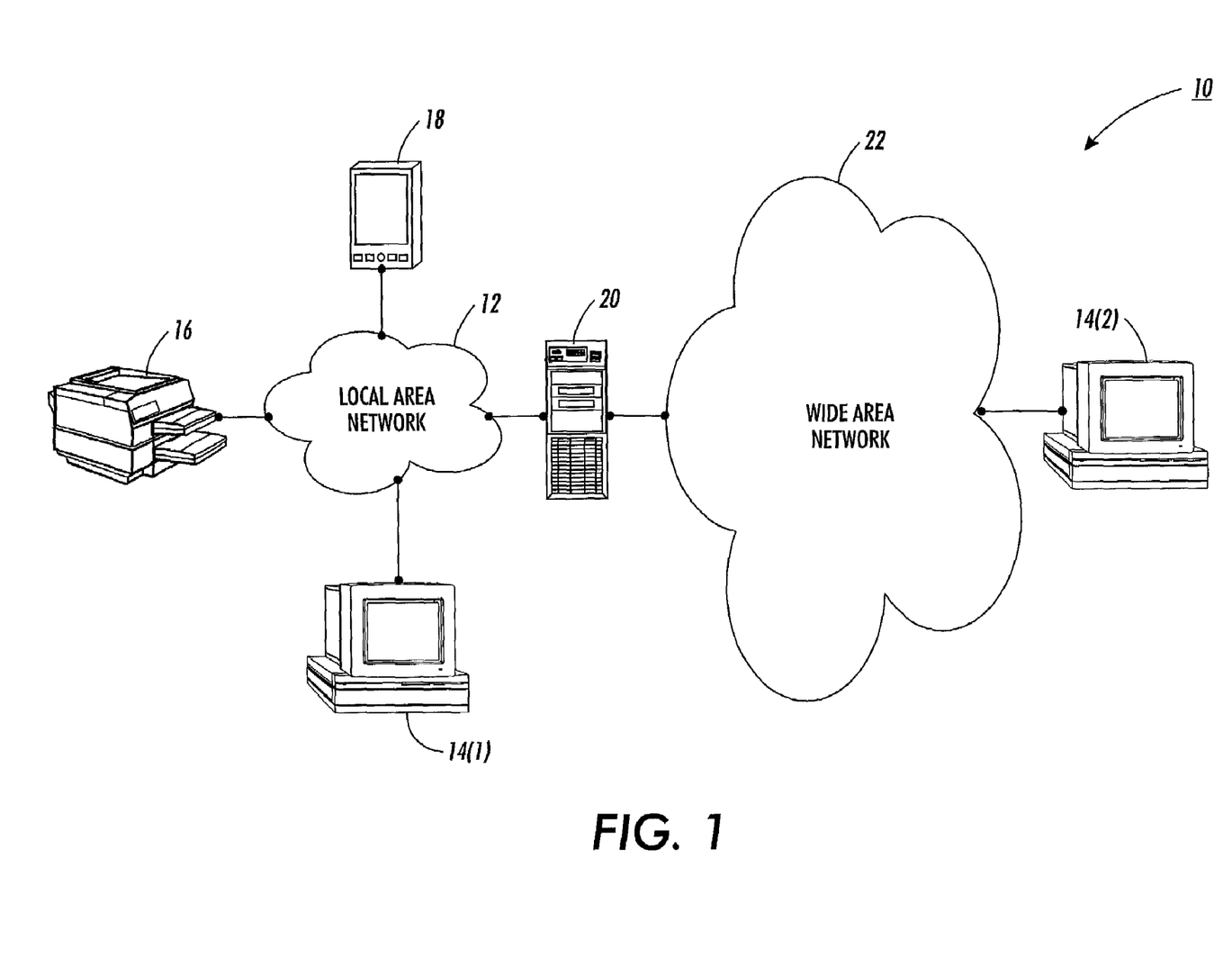
FIG. 1 is a perspective diagram of a system for controlling access to devices in accordance with embodiments of the present invention.
Figure 4:
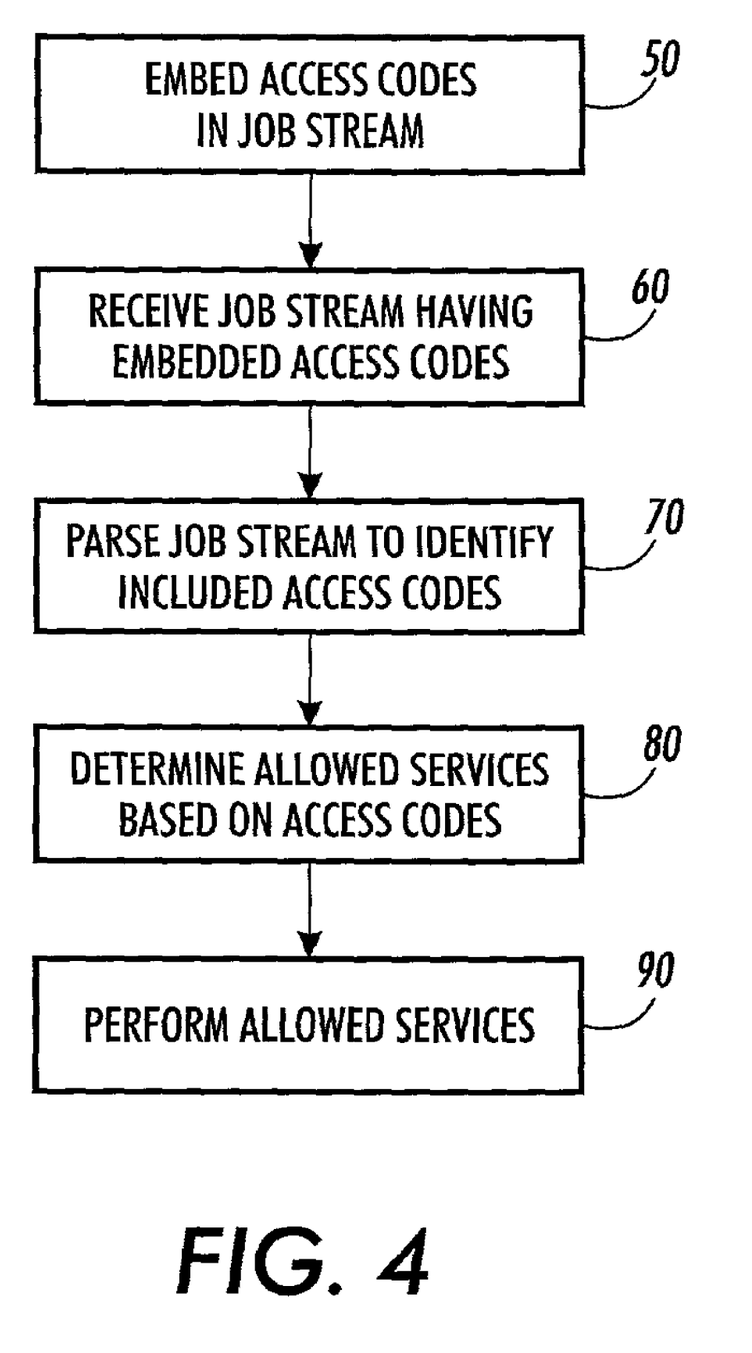
FIG. 4 is a flowchart of a process for processing job streams having embedded access codes to control access to devices in accordance with embodiments of the present invention.

A system 10 for controlling access to devices in accordance with embodiments of the present invention is shown in FIG. 1. System 10 includes a local area network ("LAN") 12, computers 14(1)-14(2), printer 16, personal digital assistant ("PDA") 18, server 20 and a wide area network ("WAN") 22, although system 10 could comprise other types and numbers of systems and devices. A method includes printer 16 parsing a job stream 43 received from computer 14(1) to find at least one embedded access code, identifying each embedded access code that matches a stored access code, and authorizing one or more printer 16 features associated with each identified matching access code. The present invention provides a system and method for inexpensively, reliably and conveniently controlling access to devices and particular device features using direct connect protocols without incurring the high costs and intensive labor or requiring specialized skills associated with using a separate job server. The present invention also enables access codes to be easily programmed or updated on the devices. Additionally, controlling access to particular device features results in efficient device resource management. Moreover, the efficient resource management enables organizations to use a lesser number of devices to provide significant cost savings.

Referring more specifically to FIG. 1, computer 14(1), printer 16, PDA 18 and server 20 are coupled to each other by way of LAN 12, although they may be coupled directly to each other by a bus. In embodiments of the present invention, LAN 12 comprises an Ethernet® network, developed by the assignees of the present invention, although LAN 12 may comprise other types of networks including a Novell®, 3Com® or IBM PC® LAN network. Moreover, LAN 12 is organized in a bus network configuration, although a number of other network configurations may be utilized such as a token ring, star, tree or mesh configuration depending on the needs, resources and types of devices in LAN 12. Computer 14(1), printer 16, PDA 18 and server 20 are coupled to and may communicate with the LAN 12 by way of a network interface, although the devices may be coupled to LAN 12 by telephone lines through public branch exchanges ("PBX"), xDSL or ISDN connections. Where a PBX is used, for example, the devices may communicate with server 20 to gain access to the LAN 12.

Figure 2:
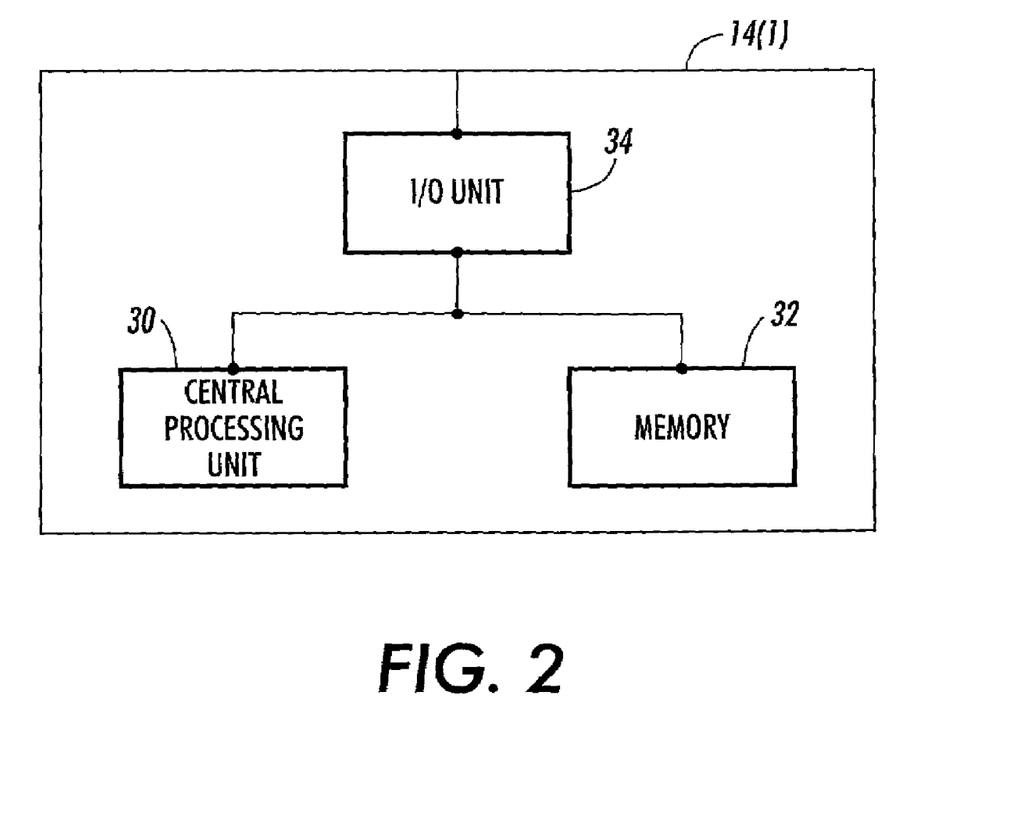
FIG. 2 is a block diagram of a computer used in a system for controlling access to devices.

Referring to FIG. 2, in embodiments of the present invention, computer 14(1) comprises a personal desktop computer such as an IBM PC using a Windows operating system ("OS") platform, although computer 14(1) may comprise a Macintosh or SUN Microsystems® computer using a Macintosh® or SunOS® OS platform, respectively. Moreover, besides personal desktop computers, computer 14(1) may comprise any type of device or system that can store, process and execute instructions, or any device with circuitry that is hardwired to execute instructions for performing one or more methods of the present invention as described and illustrated herein.

Computer 14(1) includes central processing unit ("CPU") 30, memory 32 and I/O unit 34, which are coupled together by one or more buses. In embodiments of the present invention, CPU 30 comprises an Intel Pentium III® processor, although CPU 30 may comprise other processors such as a PowerPC G4® or a picoJava I® processor depending upon the particular type of device computer 14(1) is. The CPU 30 executes at least one program of stored instructions for a method of controlling access to network devices in accordance with embodiments of the present invention. CPU 30 may also execute instructions for other tasks, including network devices such as providing data, memory, file directories, individual files, word processing applications, accounting applications or engineering applications. As a result, when one of these applications is executed, the instructions for the task, such as for creating a spreadsheet, as well as the instructions for performing one or more of the methods of the present invention are executed by the CPU 30. The instructions may be expressed as executable programs written in a number of computer programming languages, such as BASIC, Pascal, C, C++, C#, Java, Perl, COBOL, FORTRAN, assembly language, machine code language, or any computer code or language that can be understood and performed by the CPU 30.

Memory 32 comprises a hard-disk computer-readable medium, although memory 32 may comprise any type of fixed or portable medium accessible by the CPU 30 such as floppy-disks, compact-discs, digital-video discs, magnetic tape, optical disk, Ferro-electric memory, Ferro-magnetic memory, read-only memory, random access memory, electrically erasable programmable read-only memory, erasable programmable read-only memory, flash memory, static random access memory, dynamic random access memory, charge coupled devices, smart cards, or any other type of computer-readable mediums. Memory 32 stores instructions and data for performing the present invention for execution by CPU 30, although some or all of these instructions and data may be stored elsewhere. Although the CPU 30 and memory 32 are shown in the same physical location, they may be located in different physical locations, such as in server 20 shown in FIG. 1.

I/O unit 34 comprises an Ethernet® network interface, although I/O unit 34 may comprise other devices such as a modem. I/O unit 34 enables computer 14(1) to communicate with LAN 12, and hence printer 16, PDA 18 and server 20.

Figure 3:
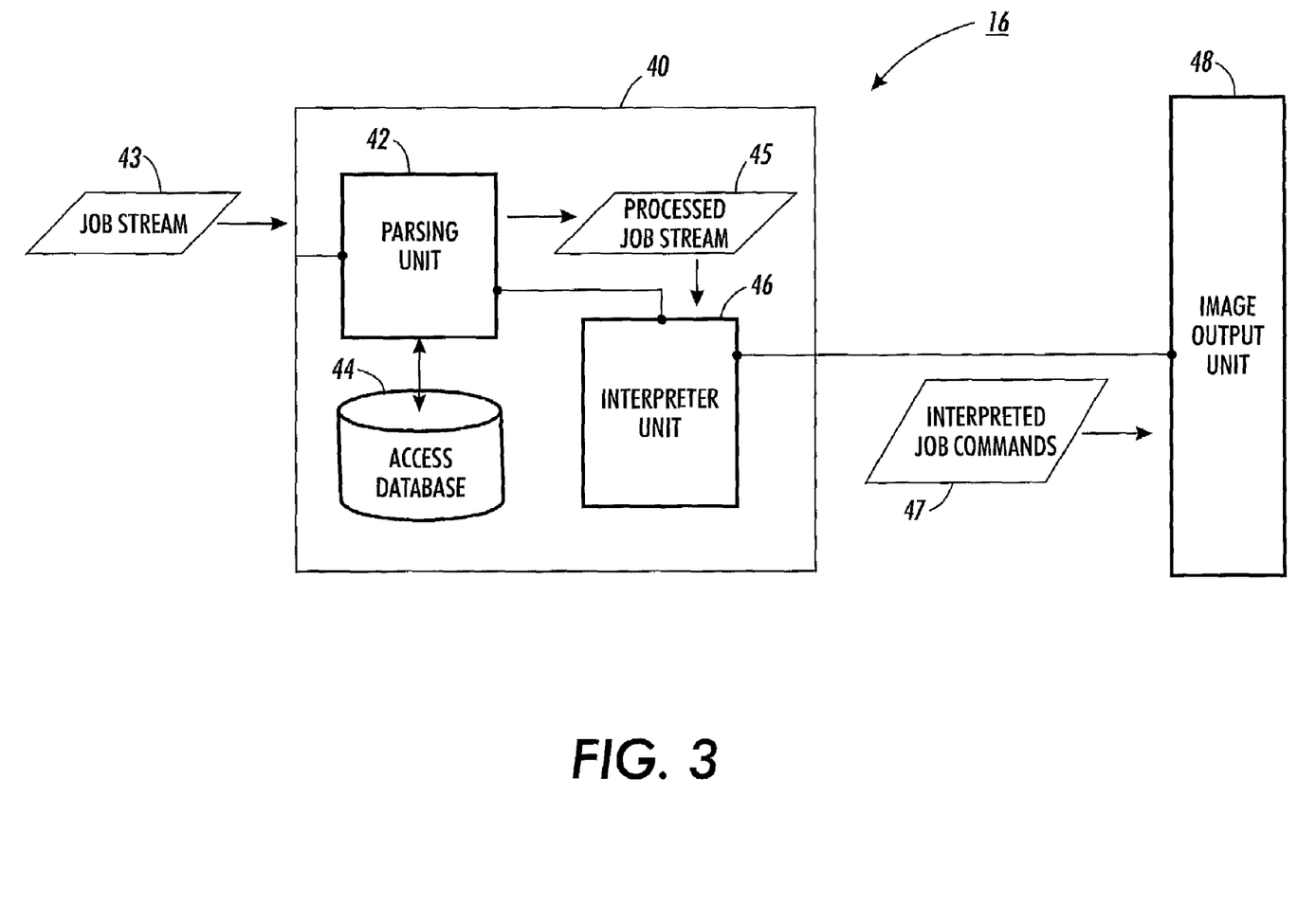
FIG. 3 is a block diagram of a printer used in a system for controlling access to devices.

Referring to FIG. 3, printer 16 comprises a digital front end ("DFE") controller 40 and an image output terminal ("IOT") 48. The DFE controller 40 processes print job streams 43 received from one or more devices in LAN 12 and controls IOT 48 for outputting a printed image in accordance with the present invention as will be described in further detail with respect to steps 50-90 in FIG. 4. In embodiments of the present invention, the DFE controller 40 includes a parsing unit 42, access database 44 and an interpreter unit 46.

Parsing unit 42 is coupled to interpreter unit 46 by one or more buses. Moreover, parsing unit 42 comprises one or more processors, circuitry and memory storage devices (not illustrated), which may also be coupled together by one or more buses. The memory storage devices associated with unit 42 comprise a hard-disk drive computer-readable medium, although the memory devices may comprise any of the mediums described above with respect to memory 32 of computer 14(1). Parsing unit 42 executes one or more programs of instructions stored in its memory for processing job streams 43 received from LAN 12, which will be described in further detail in connection with step 50 in FIG. 4.

Job stream 43 comprises a text file having one or more Level 2 PostScript® printer language instructions organized into a prolog portion and a script portion, which represents images and/or text generated by one or more device drivers or applications executed by computer 14(1), although job stream 43 may comprise a file including Level 1 and Level 3 PostScript®, PDF, HP-GL, PCL, PCL5, PCL XL, GDI, ESC/P2, BJC or PJL/PCL instructions depending on the type of application that generates it. Moreover, job stream 43 includes one or more access codes associated with authorized printing options associated with printer 16, although the stream 43 need not include any access codes as described in further detail in connection with step 50 in FIG. 4 and with respect to FIG. 5.

Access database 44 comprises a relational database having a collection of information logically organized by fields, records or files, for example, although database 44 may comprise a look-up table logically organized by rows and columns (e.g., a spreadsheet). Access database 44 is stored in one or more memory storage devices associated with parsing unit 42, although database 44 may be stored elsewhere such as in a memory associated with server 20. In embodiments of the present invention, access database 44 may include an access code identifier field, a printing option field and an enabled option field. Each value stored in the access code identifier field is associated with one or more values representing printing options available for printer 16, the associated printing options stored in the printing option fields. Further, each of the associated access code identifier and printing option fields may have an associated option enabled field, which includes a value (e.g., TRUE or FALSE) representing whether an associated printing option has been enabled for a job stream 43. By way of example only, the access database 44 may be organized and include the exemplary values shown below in Table 1:

TABLE 1

| ACCESS CODE IDENTIFIER | PRINTING OPTION | OPTION ENABLED |
|---|---|---|
| 00000 | Default Printing Options: Monochrome Printing Half Duplex Printing Manual Feed Source | TRUE |
| 44509 | All Available Printing Options | FALSE |
| 54321 | Color printing | FALSE |
| 24357 | Monochrome Printing | FALSE |
| 88988 | Full Duplex Printing | FALSE |
| 11111 | Priority Printing | FALSE |
| 45335 | Mailbox Destination #1 | FALSE |
| 75645 | Mailbox Destination #2 | FALSE |
| . | . | . |
| . | . | . |
| . | . | . |
| 13343 | Mailbox Destination #n | FALSE |
| 67436 | Manual Feed Source | FALSE |
| 95464 | High Page Count (100<) Printing | FALSE |
| 87675 | Non-business Hours Printing | FALSE |
| 64343 | Standard Size Paper (8 ½" × 11") | FALSE |
| 64344 | A4 Size Paper | FALSE |
| 64345 | Envelope Printing | FALSE |
| 54422 | Printing Paper Color | FALSE |
| 10235 | Media Type | FALSE |
| 05013 | Large Media Printing | FALSE |
| 86432 | Stapling | FALSE |
| 24673 | Network Fax | FALSE |

Moreover, one or more of the access code identifier fields may have one or more printing options associated therewith. In this example, the access code identifier field "00000" is associated with monochrome, half duplex and manual feed source printing options. Moreover, the associated option enabled field may initially store a "TRUE" value representing that the associated printing options are authorized for a job stream 43.

Processed job stream 45 is the same as the job stream 43 described above, except it is modified by parsing unit 42 as will be described in further detail below in connection with steps 60-80 in FIG. 4.

Interpreter unit 46 is coupled to IOT 48 by one or more buses, although LAN 12 may couple unit 46 to IOT 48. In embodiments of the present invention, interpreter unit 46 comprises a hardware implemented PostScript® interpreter including one or more processors, circuitry and memory storage devices (not illustrated), which may be coupled together by one or more buses, to execute PostScript® printer language instructions included in processed job stream 45 for controlling IOT 48 to perform printing operations, although interpreter unit 46 may also comprise a software implemented PostScript® interpreter such as an InkWell®, Ghostscript® or UCB® interpreter stored on one or more memory storage devices associated with parsing unit 42 or server 20. In addition to PostScript® instructions, interpreter unit 46 may be programmed or configured to execute other types of printer language instructions that may be included in processed job stream 45 such as Level 1 and Level 3 PostScript®, HP-GL, PCL, PCL5, GDI, ESC/P2, BJC or PJL/PCL instructions.

IOT 48 comprises a LASER raster output scanner, although IOT 48 may comprise a number of raster output devices including inkjet, dot-matrix, digital imagesetter or raster scan display devices. In embodiments of the present invention, IOT 48 directs one or more lasers, in response to the interpreter unit as mentioned above, towards a charged xerographic photoreceptor to discharge portions thereof in an imagewise pattern leaving unexposed areas charged during printing.

Referring back to FIG. 1, PDA 18 comprises a hand-held computer device that may perform such functions as telephony, facsimile transmissions, networking or one or more of the applications described above with respect to computer 14(1).

Server 20 comprises a computer system having one or more processors, memory, and I/O units, which may be coupled together by one or more buses. Server 20 may also operate as a gateway system enabling computer 14(2) to communicate with printer 16 and may perform other server functions, although server 20 may also enable computer 14(2) to communicate with computer 14(1) and PDA 18.

WAN 22 is coupled to LAN 12 by way of server 20. In embodiments of the present invention, WAN 22 comprises the Internet, although it may comprise other public or private networks such as a proprietary organizational network spread out over several geographical locations. Further, WAN 22 includes computer 14(2), although WAN 22 may include additional devices or systems. Computer 14(2) is the same as computer 14(1), except computer 14(2) is coupled to WAN 22. Moreover, computer 14(2) is coupled to WAN 22 in the same manner described above with respect to LAN 12 and computer 14(2).

Figure 5:
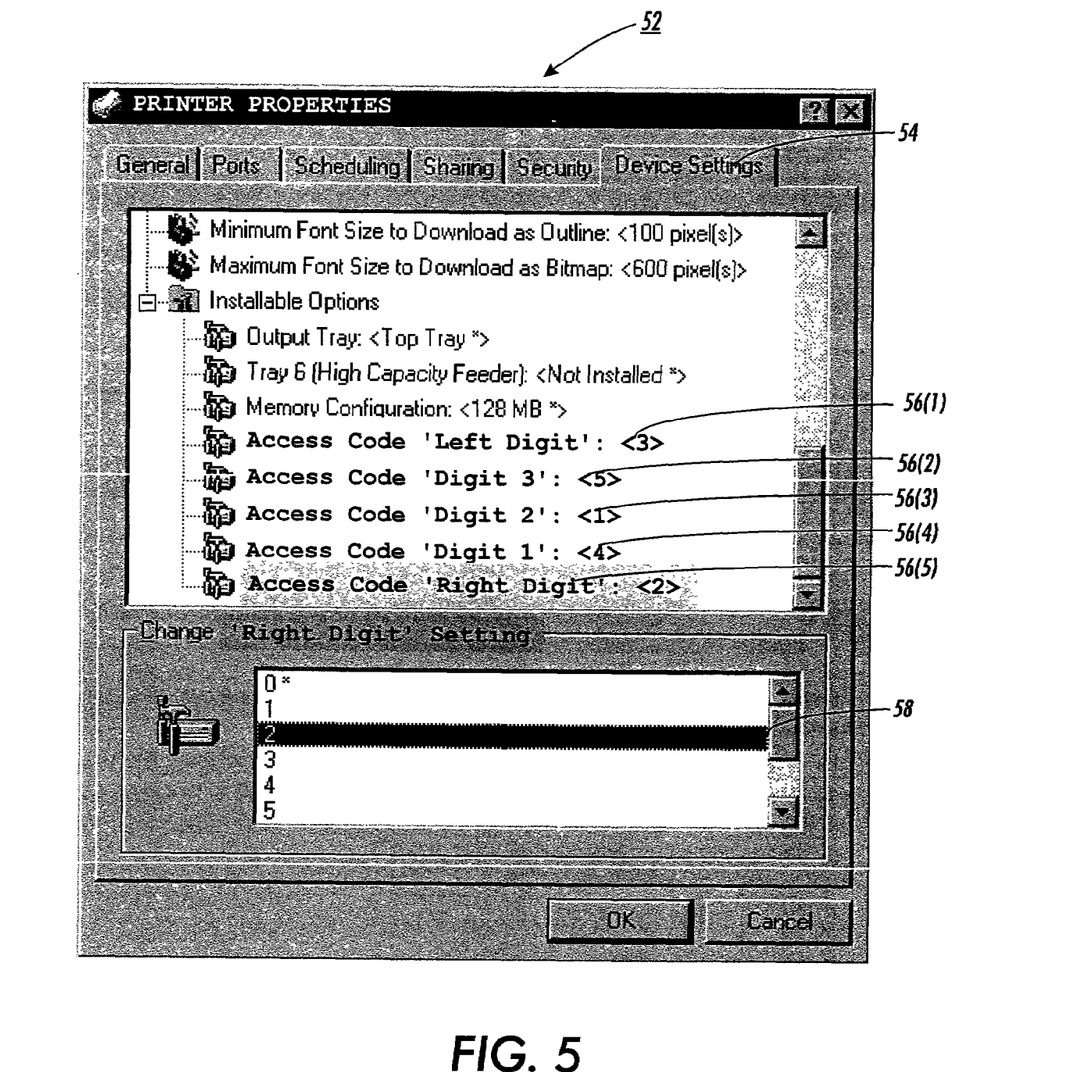
FIG. 5 is an exemplary screen print of a printer device driver interface that allows users to set access codes to be embedded in job streams.

Referring to FIGS. 4-5 and with reference to Table 1 above, the operation of system 10 for controlling access to network devices will now be described. At step 50, computer 14(1) embeds one or more access codes within stream 43 when generating it. In embodiments of the present invention, each access code identifier provides computer 14(1) with authorization to one or more particular printing options or features of printer 16, although a default access code identifier (e.g., "00000") may be initially provided to computer 14(1) for accessing printer 16. In particular, a device driver of printer 16 (e.g., Xerox® DCCS50® device driver) is responsible for converting documents (i.e., images and/or text) generated by one or more applications operating on computer 14(1) into job streams 43 having one or more PostScript® instructions, although the driver may be directly associated with the one or more applications (e.g., Adobe® PageMaker® 7.0).

In embodiments of the present invention, the device driver comprises a custom driver that replaces a conventional OEM device driver associated with printer 16 or the one or more applications, although OEM drivers associated with printer 16 or the applications may be used. In either case, the driver is programmed to accept access code identifiers for providing computer 14(1) with access to particular features of printer 16 and to embed the identifiers in stream 43 as explained herein below. Where a custom driver is used, however, additional functionality may be gained by including the ability to specify the particular features of printer 16 available for associating with access code identifiers or providing security features such as not allowing identifiers to be displayed while being entered using a driver interface, for example.

Referring to FIG. 5, a printer interface 52 enables an exemplary OEM device driver associated with printer 16 to be programmed with the one or more access code identifiers. The printer interface 52 is stored at computer 14(1) and may be executed by computer 14(1) to set various options and utilize particular features with respect to printer 16 during printing, although the interface 52 may be stored at any of the devices in LAN 12 (e.g., server 20). In particular, a user such as an employee or system administrator ("SA") may select a device driver icon associated with printer 16 using one or more user input devices (e.g., mouse, keyboard, etc.), which is displayed on a display device of computer 14(1). For instance, when the user manipulates the input device (e.g., mouse) to move a cursor or other graphical indicator over the device icon and pushes the mouse button (e.g., left mouse button) downward, the mouse sends a signal to the CPU 30 that causes it to execute and display the interface 52. To enter an access code identifier into computer 14(1), the device settings tab 54 may be selected and the access code identifier digits 56(1)-56 (5) entered in using one or more of the input devices. A user may enter identifier digit 56 (5) by selecting right digit setting 58 and typing in the desired value (0, 1, . . . , 9) at the location of identifier digit 56(5) in printer interface 52, for example. The access code identifiers and their associated user rights with respect to printer 16 ("access codes") are stored in memory 32 of computer 14(1), which the driver may retrieve when needed as described further herein.

Referring back to FIG. 4 and step 50, a user operating an application such as a word processing program generates a document and selects various printing options for printing the document by way of a displayed print request window (not illustrated) associated with printer 16 or the application. In this example, computer 14(1) generates job stream 43 using a device driver associated with the word processing application. Moreover, the driver retrieves the access codes stored in memory 32 and in this embodiment includes them in stream 43 in the form of PostScript® print job language ("PJL") comments (e.g., '@PJL SET XRXACCOUNTINGINFO="12345"' or '@PJL SET COLORCODE="54321"'). In embodiments of the present invention, the access codes are inserted in a particular area within job stream 43, such as the beginning of the prolog portion of job stream 43, although the codes may be inserted at any location of stream 43 so long as parsing unit 42 is able to locate the access codes in stream 43 for performing step 70. In embodiments of the present invention, once computer 14(1) includes all of the access codes retrieved from memory 32 in job stream 43, the driver generates and includes in stream 43 the PostScript® language instructions that may be executed by a device (e.g., printer 16) for rendering the document. In this example, the document is in a file format associated with the word processing application (e.g., Word® file format).

Next at step 60, printer 16 receives job stream 43 (e.g., PostScript® file with embedded access codes) from computer 14(1) by way of LAN 12. Printer 16 receives the job stream 43 and sends it to the parsing unit 42 for further processing as described herein below.

Next at step 70, parsing unit 42 parses the job stream 43 to identify embedded access codes. As described above in step 50, the embedded codes may comprise one or more PJL comments included in the job stream 43. In embodiments of the present invention, the parsing unit 42 examines each line in job stream 43 starting at the beginning of the prolog portion to determine whether the line includes an embedded access code or an instruction representing a selected user printing option (e.g., color printing), although unit 42 may start parsing at any area of stream 43 where it is programmed to begin.

In embodiments of the present invention, a line beginning with an "@" identifier represents an embedded access code, although other identifiers may be used. If parsing unit 42 identifies a line beginning with the "@" identifier, it determines the line includes an embedded access code and further examines the line to identify the access code identifier included therein.

Next at step 80, parsing unit 42 searches access database 44 for the value represented by the access code identifier parsed from job stream 43, as described above in step 70, to determine the allowed feature associated with printer 16 for job stream 43. For instance, with reference to Table 1 above, if parsing unit 42 identifies an access code identifier in job stream 43 having a value of "54321" and searches the access code identifier field included in database 44 for the value "54321," upon finding the matching value parsing unit 42 determines that computer 14(1) is authorized to perform color printing according to the value stored in the printing option field. Parsing unit 42 may then change the value in the associated option enabled field from an initial value of "FALSE" to "TRUE" for indicating the associated printing option (i.e., color printing) authorized for job stream 43. In this example, parsing unit 42 creates the processed job stream 45 as a file while steps 70-80 are performed, although processed stream 45 may comprise serial data representing each line of job stream 43 as it is processed by parsing unit 42. In particular, parsing unit 42 inserts in processed job stream 45 the appropriate Postscripts instruction (e.g., "<</ProcessColorModel (DeviceCMYK)>>SetPageDevice") corresponding to the authorized printing option identified above.

Parsing unit 42 performs steps 70-80 as described above until it determines all of the embedded codes have been parsed by reading a particular identifier in job stream 43 such as a special alphanumeric value, for example. Once parsing unit 42 has parsed all of the embedded access codes from job stream 43 and has included the corresponding Postscripts instructions in processed stream 45, parsing unit 42 continues to examine each line in job stream 43 to identify one or more "SetPageDevice" strings. As unit 42 identifies each string, it determines the line includes an instruction representing a user selected printing option inserted during the generation of job stream 43 as described above in step 50, and examines the line further to identify the particular printing option being specified by the instruction.

Parsing unit 42 checks the value of the associated option enabled field in access database 44 to determine whether the user selected printing option has been authorized for the job stream 43 as described above in step 80. If the option enabled value is "FALSE," parsing unit 42 may include in processed stream 45 an instruction representing a default printing option for the particular feature. For instance, if a user selects color printing as an option in generating a document, and hence job stream 43, and after performing steps 70-80 the value in the option enabled field associated with the option identifier in access database 44 is "FALSE," unit 42 may include an instruction in processed stream 45 for monochrome printing (e.g., "<</ProcessColorModel (DeviceGray)>>SetPageDevice"). If the option enabled value is "TRUE," parsing unit 42 may include in processed stream 45 an instruction representing the authorized printing option. For instance, if a user selects color printing as an option in generating a document, and hence job stream 43, and after performing steps 70-80 the value in the option enabled field associated with the option identifier in access database 44 is "TRUE," unit 42 may include an instruction for color printing (e.g., "<</ProcessColorModel (DeviceCMYK)>>SetPageDevice"). Parsing unit 42 continues to examine each line of job stream 43 as described above until it determines all of the "SetPageDevice" instructions have been identified by reading a particular identifier in job stream 43 such as a special alphanumeric identifier, for example.

Next at step 90, interpreter unit 46 receives the processed job stream 45 and interprets each instruction to control IOT 48. In particular, interpreter unit 46 interprets each line of processed job stream 45 and sends to IOT 48 the appropriate instructions as interpreted job commands 47. IOT 48 executes the interpreted job commands 47 and prints the images and/or text according to the instructions included therein.

In another embodiment of the present invention, steps 50-90 are performed in the same manner described above, except at step 50 rather than embedding the access codes in job stream 43 as comments, the computer 14(1) by way of the device driver embeds the access codes in job stream 43 by inserting the actual PostScript® instructions (e.g., SetPageDevice) and other PostScript® procedures and instructions as defined in the PostScript® Language Reference, Third Edition, Adobe Systems, Inc., Addison-Wesley Publishing Company, 1999, which is hereby incorporated by reference in its entirety, for example.

Further, before the device driver generates and includes in job stream 43 the instructions for the user selected printing options (e.g., color printing), it may check the user's selection against the access code identifiers stored in memory 32, although the driver may check the selections against the authorized options during or after it generates the instruction. For instance, the user may operate an application to generate a document and request that it be printed in color. In checking memory 32 for the associated access code identifier, if a match is found then the driver may include the appropriate PostScript® instruction (e.g., "<</ProcessColorModel (DeviceCMYK)>>SetPageDevice") to enable the requested, authorized printing option (i.e., color printing) for the document. If no match is found the driver may include a PostScript® instruction (e.g., "<</ProcessColorModel (DeviceGray)>>SetPageDevice") representing a default option of the particular printing option (e.g., gray scale printing). Thus, in this embodiment steps 60-80 need not be performed, and step 90 may be performed by sending the job stream 43 directly to the IOT 48 after performing step 50 as described above.

In another embodiment of the present invention, steps 50-90 are performed in the same manner described above, except after performing steps 70-80 if parsing unit 42 does not identify at least one embedded access code in job stream 43 then it may include one or more PostScript® instructions in processed job stream 45 representing one or more default printing options (e.g., monochrome, half duplex and manual feed source printing options) associated with a default access code identifier (e.g., "00000") included in access database 44. Further, in this embodiment if parsing unit 42 at step 80 determines that a user selected printing option is not authorized for the job stream 43 by identifying a "FALSE" value in the associated option enabled field in access database 44, parsing unit 42 may cease performing steps 80-90 thereby refusing to process job stream 43. Moreover, parsing unit 42 may generate an error message and transmit the message to computer 14(1) expressing the rejection of job stream 43 by printer 16 and identifying the unauthorized printer option that was requested.

In another embodiment of the present invention, steps 50-90 are performed in the same manner described above, except at step 50 a user (e.g., SA) using server 20, for example, remotely programs computer 14(1) with the access codes and associated features or remotely provides to computer 14(1) by way of LAN 12 the custom drivers and/or software filters described above in embodiments of the present invention. Moreover, the user may program computer 14(1) directly to include the one or more codes where an OEM driver is used. Further, a portable computer-readable medium (e.g., floppy-disk, compact-disk, etc.), including the custom drivers, OEM drivers, software filters and/or databases having the access codes and associated features described above may be provided to computer 14(1) for execution and accessing.

In another embodiment of the present invention, steps 50-90 are performed in the same manner described above, except at step 50 the access codes may be directly programmed in computer 14(1) without using printer interface 52, or modifying or programming the device drivers. In such embodiments, a software filter may be stored at computer 14(1) or server 20, for example, and computer 14(1) may be programmed to automatically execute the filter each time computer 14(1) requests access to printer 16 to print documents. Thus, the software filter may include instructions for intercepting job streams 43 en route to printer 16. Upon execution of the software filter, computer 14(1) would embed the PJL comments or PostScript® instructions having the access codes in the job streams 43 as described above in steps 60-90 in embodiments of the present invention.

In another embodiment of the present invention, steps 50-90 are performed in the same manner described above, except computer 14(2), PDA 18, and/or server 20 perform the operations performed by computer 14(1). In this embodiment, users at computer 14(2), PDA 18 and/or server 20 operate applications for generating job streams 43, which are sent to printer 16 and processed in the same manner as described above in steps 50-90 in embodiments of the present invention.

Other modifications of the present invention may occur to those skilled in the art subsequent to a review of the present application, and these modifications, including equivalents thereof, are intended to be included within the scope of the present invention. Further, the recited order of processing elements or sequences, or the use of numbers, letters, or other designations therefor, is not intended to limit the claimed processes to any order except as may be specified in the claims.

What is claimed is:

1. A system comprising:
    an access code system that embeds at least one access code in a job stream, each embedded code authorizing access to a particular subset of a plurality of device features, but not to other device features of the device; and
    a job transmission system that transmits the job stream to a device,
    wherein each embedded code is matched with an access code stored in memory and wherein the authorization of the particular subset of a plurality of device features occurs if each identified access code embedded in the job stream matches each stored access code for a particular job, and
    wherein each stored access code correlates to enabling the particular subset of a plurality of device features for the particular job.

2. The system as set forth in claim 1 wherein the embedded access code further comprises at least one job control entity or at least one page description language instruction having a unique identifier.

3. The system as set forth in claim 1 wherein the job stream further comprises a file having at least one page description language instruction.

4. The system as set forth in claim 1 wherein the subset of a plurality of device features comprises color printing, monochrome printing, duplex printing, a mailbox destination to send printed documents to, manual feed source printing, high page count printing, non-business hours printing, large media printing, printing media type, printing paper size, printing paper color and network facsimile document sending.

5. The system as set forth in claim 1 wherein the device comprises a printer.

6. A method comprising:
embedding at least one access code in a job stream, each embedded code authorizing access to a particular subset of a plurality of device features, but not to other device features of the device; and
transmitting the job stream to a device,
wherein each embedded code is matched with an access code stored in memory and wherein the authorization of the particular subset of a plurality of device features occurs if each identified access code embedded in the job stream matches each stored access code for a particular job, and
wherein each stored access code correlates to enabling the particular subset of a plurality of device features for the particular job.

7. The method as set forth in claim 6 wherein the embedded access code further comprises at least one job control entity or at least one page description language instruction having a unique identifier.

8. The method as set forth in claim 6 wherein the job stream further comprises a file having at least one page description language instruction.

9. The method as set forth in claim 6 wherein the subset of a plurality of device features comprises color printing, monochrome printing, duplex printing, a mailbox destination to send printed documents to, manual feed source printing, high page count printing, non-business hours printing, large media printing, printing media type, printing paper size, printing paper color and network facsimile document sending.

10. A computer readable medium having stored thereon instructions, which when executed by at least one processor, causes the processor to perform:
embedding at least one access code in a job stream, each embedded code authorizing access to a particular subset of a plurality of device features, but not to other device features of the device; and
transmitting the job stream to a device,
wherein each embedded code is matched with an access code stored in memory and wherein the authorization of the particular subset of a plurality of device features occurs if each identified access code embedded in the job stream matches each stored access code for a particular job, and
wherein each stored access code correlates to enabling the particular subset of a plurality of device features for the particular job.

11. The medium as set forth in claim 10 wherein the embedded access code further comprises at least one job control entity or at least one page description language instruction having a unique identifier.

12. The medium as set forth in claim 10 wherein the job stream further comprises a file having at least one page description language instruction.

13. The medium as set forth in claim 10 wherein the subset of a plurality of device features comprises color printing, monochrome printing, duplex printing, a mailbox destination to send printed documents to, manual feed source printing, high page count printing, non-business hours printing, large media printing, printing media type, printing paper size, printing paper color and network facsimile document sending.

14. A system comprising:
a parsing system that parses a job stream to find at least one embedded access code;
an access code identification system that identifies each embedded access code matching a stored access code, each stored access code permitting access to a particular subset of a plurality of device features but not to other features of a device; and
an authorization system that authorizes at least one device feature associated with each identified matching access code,
wherein each stored access code is matched with an access code stored in memory and wherein the authorization of the particular subset of a plurality of device features occurs if each identified access code embedded in the job stream matches each stored access code for a particular job, and
wherein each stored access code correlates to enabling the particular subset of a plurality of device features for the particular job.

15. The system as set forth in claim 14 wherein the subset of a plurality of device features comprises color printing, monochrome printing, duplex printing, a mailbox destination to send printed documents to, manual feed source printing, high page count printing, non-business hours printing, large media printing, printing media type, printing paper size, printing paper color and network facsimile document sending.

16. The system as set forth in claim 14 wherein the embedded access code further comprises at least one job control entity or at least one page description language instruction having a unique identifier.

17. The system as set forth in claim 14 wherein the job stream further comprises a file having at least one job instruction and at least one feature setting instruction, each feature setting instruction corresponding to one of the authorized device features or to an unauthorized device feature.

18. The system as set forth in claim 17 further comprising a device that executes the job instructions and only the feature setting instructions corresponding to the authorized device features.

19. The system as set forth in claim 18 wherein the device comprises a printer, the printer executing the job instructions and the authorized feature setting instructions to print a document.

20. A method comprising:
parsing a job stream to find at least one embedded access code;
identifying each embedded access code that matches a stored access code, each embedded code permitting access to a particular subset of a plurality of device features, but not to other device features of the device; and
authorizing at least one device feature associated with each identified matching access code,
wherein each embedded code is matched with an access code stored in memory and wherein the authorization of the particular subset of a plurality of device features occurs if each identified access code embedded in the job stream matches each stored access code for a particular job, and
wherein each stored access code correlates to enabling the particular subset of a plurality of device features for the particular job.

21. The method as set forth in claim 20 wherein the subset of a plurality of device features comprises color printing, monochrome printing, duplex printing, a mailbox destination to send printed documents to, manual feed source printing, high page count printing, non-business hours printing, large media printing, printing media type, printing paper size, printing paper color and network facsimile document sending.

22. The method as set forth in claim 20 wherein the embedded access code further comprises at least one job control entity or at least one page description language instruction having a unique identifier.

23. The method as set forth in claim 20 wherein the job stream further comprises a file having at least one job instruction and at least one feature setting instruction, each feature setting instruction corresponding to one of the authorized device features or to an unauthorized device feature.

24. The method as set forth in claim 23 further comprising executing the job instructions and only the feature setting instructions corresponding to the authorized device features.

25. The method as set forth in claim 24 further comprising executing the job instructions and the authorized feature setting instructions to print a document.

26. A computer readable medium having stored thereon instructions, which when executed by at least one processor, causes the processor to perform:
  parsing a job stream to find at least one embedded access code;
  identifying each embedded access code that matches a stored access code, each embedded code permitting access to a particular subset of a plurality of device features, but not to other device features of the device; and
  authorizing at least one device feature associated with each identified matching access code,
  wherein each embedded code is matched with an access code stored in memory and wherein the authorization of the particular subset of a plurality of device features occurs if each identified access code embedded in the job stream matches each stored access code for a particular job, and
  wherein each stored access code correlates to enabling the particular subset of a plurality of device features for the particular job.

27. The medium as set forth in claim 26 wherein the subset of a plurality of device features comprises color printing, monochrome printing, duplex printing, a mailbox destination to send printed documents to, manual feed source printing, high page count printing, non-business hours printing, large media printing, printing media type, printing paper size, printing paper color and network facsimile document sending.

28. The medium as set forth in claim 26 wherein the embedded access code further comprises at least one job control entity or at least one page description language instruction having a unique identifier.

29. The medium as set forth in claim 26 wherein the job stream further comprises a file having at least one job instruction and at least one feature setting instruction, each feature setting instruction corresponding to one of the authorized device features or to an unauthorized device feature.

30. The medium as set forth in claim 29 further comprising executing the job instructions and only the feature setting instructions corresponding to the authorized device features.

31. The medium as set forth in claim 30 further comprising executing the job instructions and the authorized feature setting instructions to print a document.

\* \* \* \* \*